United States Patent Office
2,858,169
Patented Oct. 28, 1958

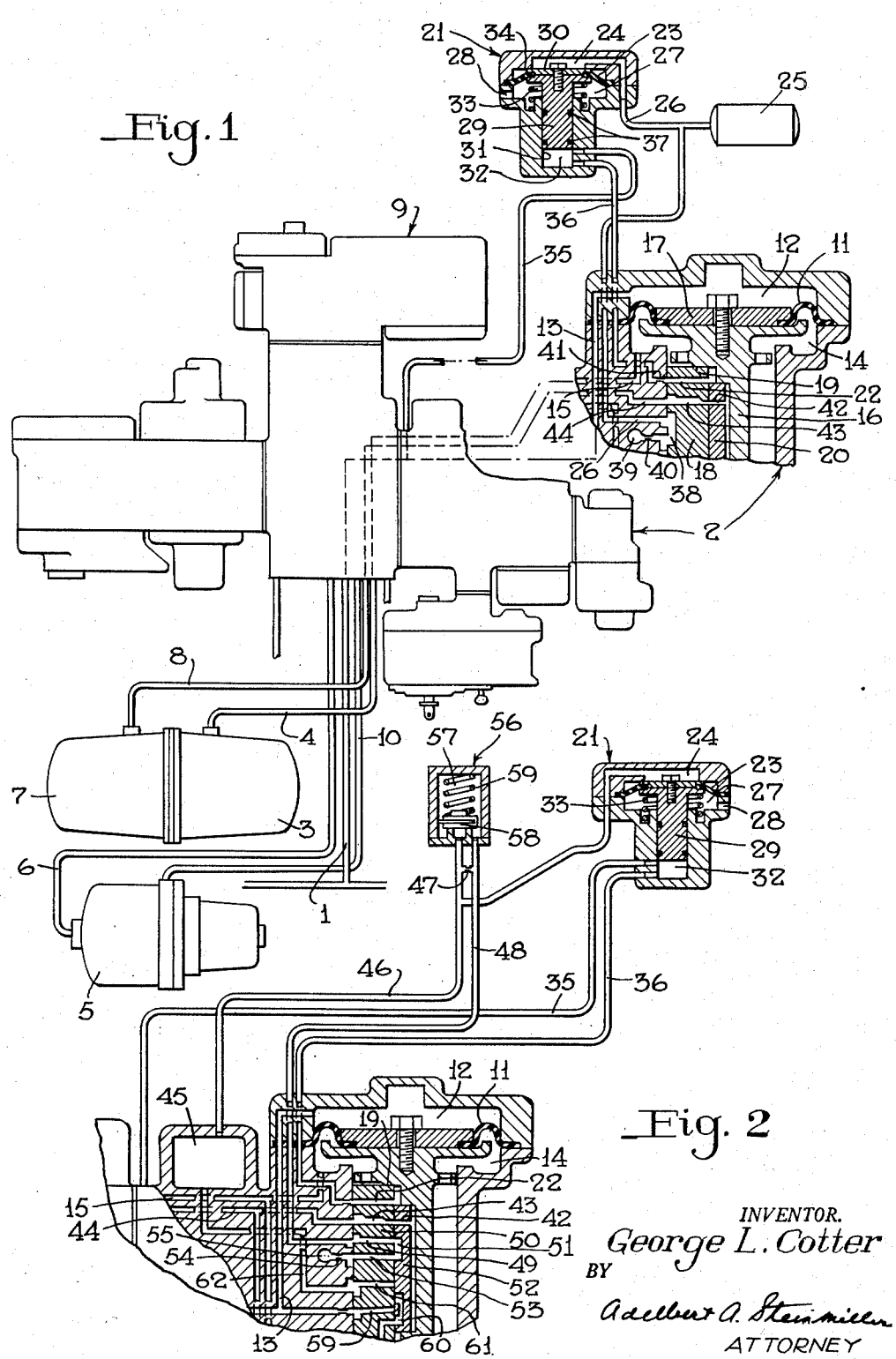

2,858,169

FLUID PRESSURE BRAKE APPARATUS

George L. Cotter, Pittsburgh, Pa., assignor to Westinghouse Air Brake Company, Wilmerding, Pa., a corporation of Pennsylvania Application March 1, 1954, Serial No. 413,263

8 Claims. (Cl. 303—36)

This invention relates to fluid pressure brake apparatus and more particularly to the railway type adapted to be controlled by variations in pressure of fluid in a brake pipe.

It is an object of this invention to provide means for more quickly causing recharge of the brake pipe throughout a train and thereby cause all control valves in the train to move to release position sooner and thus effect a more prompt and uniform release of the brake equipments throughout the train.

Another object of my invention is the provision of means for providing a delayed recharge of the reservoirs on all cars in the train in order to allow a quick and sufficient recharge of the brake pipe to insure all control valves in the train being moved to release position before the recharge operation takes effect.

Other objects and advantages will become apparent from the following more detailed description of the invention.

In the accompanying drawing, Fig. 1 is a diagrammatic view of a portion of a fluid pressure brake equipment embodying the invention, and Fig. 2 is a diagrammatic view of a modification of the invention shown in Fig. 1.

DESCRIPTION

As shown in Fig. 1 of the drawing, reference numeral 1 designates the usual brake pipe which is connected to a brake controlling valve device 2, such as that disclosed in the copending application of Glenn T. McClure, Serial No. 357,984, filed May 28, 1953, and assigned to the assignee of the present application and which is adapted to operate in the usual manner upon a service reduction in pressure in said brake pipe to supply fluid under pressure delivered from an auxiliary reservoir 3 by way of a pipe 4 to a brake cylinder device 5 by way of a pipe 6, and upon an emergency reduction in brake pipe pressure to supply additional fluid under pressure from an emergency reservoir 7 through a pipe 8 to the brake cylinder pipe 6. Fluid under pressure thus supplied to brake cylinder pipe 6 also flows to compensating valve portion 9 for the purpose of operating said portion to supply fluid under pressure through a load compensating pipe 10 to a load compensating chamber (not shown) in brake cylinder device 5 to correspondingly limit the degree of brake application in accordance with the load on the vehicle. Upon recharging of brake pipe 1 with fluid under pressure the brake controlling valve device 2 is adapted to operate in the usual manner to release fluid under pressure from the brake cylinder device 5 by way of pipe 6 causing load compensating portion 9 to release fluid under pressure from load compensating pipe 10 to effect a release of the brakes. According to the invention, recharging of the auxiliary reservoir 3 and the emergency reservoir 10, however, will be delayed for a predetermined period varying from five to ten seconds, as may be desired, in order to allow sufficient restoration of brake pipe pressure throughout the train to insure all control valve devices in the train to be operated to release position; thus the brake release throughout the train may be made more nearly simultaneous for all cars in the train, and the interval of the time elapsed between the release of brakes on the front of the train and the release of brakes on the rear of the train will be greatly reduced.

As shown in section in Fig. 1 the brake controlling valve device 2 comprises a flexible diaphragm 11 clamped about its periphery between two sections of the casing of the device. At one side of the diaphragm 11 is a control chamber 12 open to brake pipe 1 through a passage 13. At the opposite side of diaphragm 11 is a valve chamber 14 which is in constant communication with auxiliary reservoir 3 by way of a passage 15 and a pipe 4. A follower stem 16 within chamber 14 is connected at one end to the diaphragm 11 centrally thereof by conventional clamping means 17 for movement with said diaphragm. A main slide valve 18 contained in valve chamber 14 is arranged to slide on a seat in the casing through engagement of the slide valve by a shoulder 19 on stem 16 adjacent the diaphragm 11, and an auxiliary slide valve 20 is slidably mounted on a seat provided on the main slide valve 18 and disposed in a recess in the stem 16 for movement therewith.

In effecting a release of the brakes in the brake apparatus described in the aforesaid copending application, the service slide valve thereof is moved to release position in which brake pipe is connected through a charging port in a service slide valve to the service valve chamber, which in turn is connected to the auxiliary and emergency reservoirs for charging same. In the present invention a charging delay valve device 21 is interposed between a charging port 22 in the service slide valve 18 and the passage 13 which, as previously noted, is connected to brake pipe 1. The charging delay valve device 21 comprises a casing containing a diaphragm 23 clamped about its marginal edge between two sections of said casing and combining with the casing to define at one side a control chamber 24 which is connected to a timing reservoir 25 by way of a passage and pipe 26 and at the other side a chamber 27 which is open to atmosphere through a passage 28. A follower stem 29 contained in chamber 27 is connected at one side by clamping means 30 to the diaphragm 23 centrally thereof and is slidably mounted in a bore 31 in which it defines in part a chamber 32. Contained in chamber 27 is a spring 33 which urges diaphragm 23 and follower stem 29 upwardly, as viewed in the drawing, to a position defined by contact of the clamping means 30 with a shoulder 34 formed in the casing in which position chamber 32 connects a pipe 35, leading to brake pipe 1, to a charging pipe and passage 36 leading to the seat for slide valve 18 in valve device 2. A pair of sealing rings 37 carried by the follower stem 29 prevent leakage of fluid under pressure from chamber 32 to chamber 27. A branch of passage and pipe 26 connects control chamber 24 and timing reservoir 25 also to the seat for slide valve 18.

*Operation—Fig. 1*

Let it be assumed that the brake apparatus is void of fluid under pressure and that the various parts thereof are in the positions in which they are shown in the drawing.

To initially charge the brake apparatus, fluid will be supplied to the brake pipe 1 and be increased in pressure to a degree such as seventy pounds which is the normal operating pressure for freight service.

In the normal or release position of the main service slide valve 18, timing reservoir 25 and chamber 24 in the charging delay valve device 21 will be connected to atmosphere through pipe and passage 26, a cavity 38 in slide valve 18 and an atmosphere passage 39 which is restricted by a choke 40. With the control chamber 24 thus vented to atmosphere spring 33 will maintain the follower stem 29 in its uppermost, or charging, position in which it is shown in the drawing.

Fluid under pressure supplied to brake pipe 1 as described above will flow therefrom through pipe 35 to chamber 32 in the charging delay valve device 21, whence it will flow through pipe and passage 36 and a choke 41 therein, charging port 22 in the main service slide valve 18 to chamber 14, and thence through passage 15 and pipe 4 to the auxiliary reservoir 3 and through a port 42 in the auxiliary slide valve 20, a port 43 in the main slide valve 18, a passage 44 and pipe 8 to the emergency reservoir 7.

When it is desired to effect either a service or an emergency application of the brakes, pressure of fluid in brake pipe 1 will be reduced at the usual service rate or emergency rate as the case may be, either of which will cause the brake controlling valve device 2 to move to application position in the manner described in the aforementioned copending application. The choke 41 will restrict back-flow of fluid under pressure from the auxiliary reservoir 3 to the brake pipe 1 by way of brake controlling valve device 2 and charging delay valve device 21 to such an extent that the differential in pressure acting on diaphragm 11 will be sufficient to move the diaphragm and follower stem 16 and thereby the auxiliary slide valve 20 and main slide valve 18 to their application positions in which ports 22 and 43 in the main slide valve will be lapped off by said auxiliary slide valve and passages 36 and 39 in the slide valve seat will be lapped off by said main slide valve. Movement of main slide valve 18 to application position will also disconnect the emergency reservoir passage 44 from port 43 and passage 26 from atmospheric passage 39 and connect passage 26 to passage 44 by way of cavity 38 in main slide valve 18. Fluid under pressure in the emergency reservoir 7 will then flow by way of pipe 8 and passage 44, cavity 38 in the main slide valve 18, through passage and pipe 26 to timing reservoir 25 and control chamber 24 in the charging delay valve device 21. When the resulting pressure in fluid in chamber 24 becomes sufficient to overcome the opposing force of spring 33, diaphragm 23 will deflect downwardly, moving follower stem 29 to its cut-off position in which communication between brake pipe passage 35 and charging passage 36 by way of chamber 32 is cut off by the follower stem 29.

In order to release the brakes on each car in a train after a brake application, fluid under pressure is supplied from a locomotive brake control equipment to the brake pipe 1 in the usual manner in order to restore the pressure of fluid therein. Fluid under pressure supplied to brake pipe 1 will then flow through brake pipe passage 13 on an individual car to chamber 12 in the brake controlling valve device 2, but will not flow to chamber 14 because at this time charging delay valve device 21 interrupts the only communication between chamber 14 and brake pipe. Since the auxiliary reservoir 3 and emergency reservoir 7 can be charged with fluid under pressure only from chamber 14, said reservoirs likewise will not be charged with fluid under pressure at this time. When the brake pipe pressure in chamber 12 has been thus increased sufficiently over auxiliary reservoir pressure in chamber 14, diaphragm 11 will deflect downwardly, moving auxiliary slide valve 20 and main slide valve 18 to their release positions in which they are shown in the drawing. Upon movement of main slide valve 18 to its release position cavity 38 therein will again register with passage 26 and atmospheric passage 39, whereupon fluid under pressure previously supplied to timing reservoir 25 from the emergency reservoir 7 will flow at a restricted rate to atmosphere by way of passage 26, cavity 38, choke 40 and passage 39. At the same time port 22 in the main slide valve 18 is uncovered by the auxiliary slide valve 20 and brought into register with passage 36 leading to chamber 32 in the charging delay valve device 21.

After a lapse of an interval of time as determined by the relation of the volume of the timing reservoir 25 to the flow capacity of choke 40 pressure of fluid in chamber 24 connected thereto will be reduced sufficiently to permit spring 33 to return diaphragm 23 and attached follower stem 29 to the positions in which they are show in the drawing. Fluid under pressure in brake pipe 1 will then flow through passages 13 and 35, chamber 32, passage and pipe 36, choke 41 and port 22 to chamber 14 in the brake controlling valve device 2. Fluid thus supplied to chamber 14 will flow in the usual manner to auxiliary reservoir 3 by way of passage 15 and pipe 4 and to emergency reservoir 7 by way of port 42 in the auxiliary slide valve 20, port 43 in the main slide valve 18, passage 44 and pipe 8 to charge both of said reservoirs.

It is preferred that the communication between brake pipe 1 and chamber 14 which is connected to auxiliary reservoir 3 be cut off for a predetermined period of time not more than ten seconds nor less than five seconds to the end that brake pipe will be restored to normal pressure, thus effecting a release of the brakes, before restoration of normal pressure in the auxiliary and emergency reservoirs 3 and 7, respectively, has begun.

*Description—Fig. 2*

The modification of the invention shown in Fig. 2 differs from that shown in Fig. 1 only in that the pressure of fluid in a quick service volume reservoir designated by the reference numeral 45 controls the operation of the charging delay valve device 21. A pipe 46 is arranged to connect the quick service volume 45 to chamber 24 of the charging delay valve 21, which pipe may be connected to atmosphere by way of a choke 47, a pipe and passage 48, a port 49 in a main service slide valve 50, a cavity 51 in an auxiliary service slide valve 52, a port 53 in the main service slide valve, a restricted passage, or choke, 54 and an atmospheric passage 55.

A limiting valve device 56 is arranged between pipes 46 and 48 in by-passing relation with the choke 47 for determining the maximum pressure of fluid in the quick service volume 45, at which timing of a charging delay time will start. The limiting valve device 56 comprises a casing having a valve chamber 57 open to the seat for main service slide valve 50 by way of pipe 48 and containing a limiting valve 58 urged by spring 59 in said casing toward its seated position shown, in which communication between the valve chamber and pipe 46 is cut off.

In operation, the initial charging of the brake equipment having the modification shown in Fig. 2 will be the same as that described in connection with Fig. 1. That is, there will be no delay in the charging of the auxiliary and emergency reservoirs 3 and 7, respectively, since the quick service volume 45 which also serves the same purpose as the timing reservoir 25 in Fig. 1, will be at atmospheric pressure at this time as will the chamber 24 connected thereto. Consequently, spring 33 will hold piston stem 29 in its uppermost position and fluid under pressure in brake pipe 1 will flow through the presently connected pipes 35 and 36 to service valve chamber 14 and thence to the aforesaid auxiliary and emergency reservoirs in the usual manner.

When a brake application is initiated by effecting a reduction in brake pipe pressure, the diaphragm 11 in the brake controlling valve device 2 will move upwardly in response thereto and actuate the auxiliary slide valve 52 upwardly relative to the main slide valve 50 to a quick service position in which fluid under pressure in brake pipe 1 will flow to the quick service volume 45 by way of passage 13, a port 59 in the main service slide valve 50, a passage 60 in the auxiliary slide valve 52, a port 61 in the main slide valve and a passage 62 to effect a local quick service reduction in brake pipe pressure in the usual manner. It should be noted that upward movement of the auxiliary slide valve 52 also causes said valve to cut off the connection between ports 49 and 53 in the main slide valve, thereby closing communication between quick service volume 45 and atmosphere through pipes 46, choke 47, pipe 48 and atmospheric passage 55. As the brake pipe continues to reduce, diaphragm 11 in response thereto will operate the main slide valve 50 upwardly to service position in which fluid under pressure is supplied to the brake cylinder device 5 and pipe 48 and passage 54 are lapped off by the main service slide valve 50. As the brake pipe continues to reduce, diaphragm 11 in response to this reduction will operate the main slide valve 50 upwardly to service position in which fluid under pressure is supplied from the auxiliary reservoir to the brake cylinder device 5 and quick service activity is terminated by the main slide valve 50 lapping passages 59 and 62 in the main slide valve seat, thereby cutting off further flow to quick service volume 45.

When it is desired to release the brakes and recharge the brake equipment, fluid under pressure is supplied from the locomotive to the brake pipe 1 in the usual manner. Upon the ensuing increase in brake pipe pressure, diaphragm 11 will deflect downwardly, first moving the auxiliary slide valve 52 downward relative to the main slide valve 50 and thereby lapping the port 59 in the main slide valve and moving cavity 51 into register with ports 49 and 53. Further increase in brake pipe pressure deflects diaphragm 11 further downward, moving slide valves 50 and 52 to the positions in which they are shown in the drawing. In this release position port 49 will register with passage 48 and port 53 will register with passage 55. Fluid under pressure in valve chamber 57 will then flow to atmosphere by way of passage 48, port 49, cavity 51, port 53, choke 54 and passage 55. When the force exerted by pressure of fluid in chamber 57 combined with that of spring 59 acting on valve 58 becomes less than that of pressure of fluid in passage 46, said valve will unseat to permit fluid under pressure in quick service reservoir 45 to flow to atmosphere through passages 46 and 48 and the route just described until the pressure in volume 45 is reduced sufficiently to permit spring 59 to seat limiting valve 58 and terminate further flow past said limiting valve. At the same time as fluid under pressure is flowing through limiting valve device 56 as just described fluid under pressure will also be flowing from pipe 46 to pipe 48 by way of choke 47. After the seating of valve 58 fluid under pressure in quick service reservoir 45 will continue to flow to atmosphere at a reduced rate by way of choke 47 connected in parallel relation to limiting valve device 56.

The pressure retained in passage 46 by the limiting valve 56 and choke 47 acting in chamber 24 on diaphragm 23 in the delay valve device 21 will be sufficient to overcome the bias of spring 33 and thus maintain the charging pipes 35 and 36 disconnected for a desired interval of time, such as five to ten seconds, as determined by the flow capacity of choke 47. After this lapse of time pressure of fluid in chamber 24 will be reduced sufficiently to permit spring 33 to actuate the follower 29 upwardly to the position in which it is shown in the drawing. With the follower 29 in this position fluid under pressure will flow from brake pipe 1 through passage and pipe 35, chamber 32, pipe and passage 36, port 22 in the main service slide valve 50 to chamber 14 in the brake controlling valve device 2, whence it will flow to the auxiliary reservoir 3 by way of passage 15 and pipe 4 and to the emergency reservoir by way of port 42 in the auxiliary slide valve 52, port 43 in the main slide valve 50, passage 44 and pipe 8. Thus, after the operation of the reservoir charging delay valve device 21 to its open position charging of the auxiliary and emergency reservoirs with fluid under pressure will be effected in the usual manner.

SUMMARY

From the foregoing it will be seen that with this invention I have provided novel means whereby a restoration of brake pipe pressure, after effecting a brake pipe reduction, is effective in instituting a release of the brakes while charging of the auxiliary and emergency reservoirs is delayed until substantially normal pressure has been restored in the brake pipe, thereby obtaining a more uniform release of brakes and a more uniform recharging of the auxiliary and emergency reservoirs throughout the train without having an overcharge of the equipments near the locomotive.

Having now described the invention, what I claim as new and desire to secure by Letters Patent, is:

1. In a fluid pressure brake equipment, the combination of a brake pipe, an auxiliary reservoir, an emergency reservoir, a brake controlling valve device operative upon a service reduction in brake pipe pressure to a service application position in which fluid under pressure is supplied from said auxiliary reservoir to said brake cylinder device, upon an emergency reduction in brake pipe pressure to an emergency application position in which fluid under pressure is also supplied from said emergency reservoir to said brake cylinder device, and upon an increase in brake pipe pressure after one of said reductions to a brake release position to connect fluid under pressure supplied from said brake pipe to said reservoirs, a timing reservoir, an equipment charging delay valve device having a charging communication normally connecting said brake pipe to said brake controlling valve device for charging said reservoirs and operative in response to fluid at the pressure of fluid in said timing reservoir in excess of a certain degree to cut off said communication, flow restricting means incorporated in said brake controlling valve device for venting said timing reservoir to atmosphere when the brake controlling valve device is in its release position, and valve means incorporated in said brake controlling valve device operative to connect said emergency reservoir to said timing reservoir when said brake controlling valve device is in its service and emergency positions.

2. In a fluid pressure brake equipment, the combination of a brake pipe, an auxiliary reservoir, a brake cylinder device, a brake controlling valve device operative upon a service reduction in brake pipe pressure to a brake application position in which fluid under pressure is supplied from said auxiliary reservoir to said brake cylinder device and operative upon a subsequent increase in brake pipe pressure to a brake release position in which fluid under pressure may flow from said brake pipe to said auxiliary reservoir, a quick service reservoir, said brake controlling valve device being operative upon a reduction in brake pipe pressure less than a service reduction to a quick service position for releasing fluid under pressure from said brake pipe to said quick service reservoir, a charging delay valve device controlling a charging communication normally connecting said brake pipe to said brake controlling valve device for permitting charging of said auxiliary reservoir with fluid under pressure and operative in response to pressure of fluid from said quick service reservoir in excess of a certain degree to close said charging communication, flow restricting means for controlling the venting of fluid under pressure from said quick service reservoir to atmosphere when said brake controlling valve device is in said brake release position, and valve means incorporated in said brake controlling valve device operative to close off the quick service reservoir from atmosphere when said brake controlling valve device is in said brake application position.

3. In a fluid pressure brake equipment, the combination of a brake pipe, an auxiliary reservoir, a brake cylinder device, a brake controlling valve device operative upon a service reduction in brake pipe pressure to a brake application position in which fluid under pressure is supplied from said auxiliary reservoir to said brake cylinder device and operative upon a subsequent increase in brake pipe pressure to a brake release position in which fluid under pressure may flow from said brake pipe to said auxiliary reservoir, a quick service reservoir, said brake controlling valve device being operative upon a reduction in brake pipe pressure less than a service reduction to a quick service position for releasing fluid under pressure from said brake pipe to said quick service reservoir, a charging delay valve device controlling a charging communication normally connecting said brake pipe to said brake controlling valve device for permitting charging of said auxiliary reservoir with fluid under pressure and operative in response to pressure of fluid from said quick service reservoir in excess of a certain degree to close said charging communication, flow restricting means for controlling the venting of fluid under pressure from said quick service reservoir to atmosphere when said brake controlling valve device is in said brake release position, pressure limiting means in by-passing relation to said flow restricting means for determining the pressure of fluid in said quick service reservoir at which said venting will become controlled by said flow restricting means, and valve means incorporated in said brake controlling valve device operative to close off the quick service reservoir from atmosphere when said brake controlling valve device is in said brake application position.

4. In a fluid pressure brake equipment, the combination of a brake pipe, an auxiliary reservoir, a brake cylinder device, a brake controlling valve device comprising a movable abutment subject on one side to pressure of fluid in said brake pipe and on the other side to pressure of fluid in said auxiliary reservoir, valve means operable by said movable abutment upon a reduction in brake pipe pressure to supply fluid under pressure from said auxiliary reservoir to said brake cylinder device and upon an increase in brake pipe pressure to release fluid under pressure from said brake cylinder device to atmosphere and to permit flow of fluid under pressure from said brake pipe to said auxiliary reservoir, a timing reservoir having no fluid pressure communication with said brake cylinder device, and a charging delay valve device controlling a charging communication normally connecting said brake pipe to said brake controlling valve device for permitting charging of said auxiliary reservoir and operative in response to fluid at the pressure of fluid in said timing reservoir in excess of a certain value to close said charging communication, said valve means including means operable by said movable abutment in response to an increase in brake pipe pressure to vent said timing reservoir to atmosphere at a controlled rate of flow, and said valve means also including means operative by said movable abutment means in response to a reduction in brake pipe pressure to supply fluid under pressure to said timing reservoir.

5. In a fluid pressure brake equipment, the combination of a brake pipe, an auxiliary reservoir, an emergency reservoir, a brake cylinder device, a fluid pressure charging communication via which fluid under pressure may flow from the brake pipe to said auxiliary reservoir and said emergency reservoir, a brake controlling valve device operative in response to a reduction in brake pipe pressure to a brake application position for closing said charging communication and supplying fluid under pressure from said auxiliary reservoir to said brake cylinder device and operative upon a subsequent increase in brake pipe pressure to a brake release position for releasing fluid under pressure from said brake cylinder device and permitting flow through said charging communication, a timing reservoir having no fluid pressure comunication with said brake cylinder device, a charging delay valve device controlled by pressure of fluid in said timing reservoir and operative to close said charging communication except when pressure of fluid in said timing reservoir has reduced below a chosen value, flow restricting means for controlling the rate of release of fluid under pressure from said timing reservoir, and valve means operable by movement of said brake controlling valve device to its brake application position to charge said timing reservoir with fluid at a pressure exceeding said chosen value from said emergency reservoir and operable by movement of said brake controlling valve device to its brake release position to release fluid under pressure from said timing reservoir via said flow restricting means.

6. A fluid pressure brake equipment comprising, in combination, a normally charged brake pipe, an auxiliary reservoir, a brake cylinder, a charging communication via which fluid under pressure may flow from the brake pipe to the auxiliary reservoir, brake controlling valve means responsive to a reduction in brake pipe pressure below normal charge value to close said charging communication and supply fluid under pressure to said brake cylinder and operative to a brake release position responsively to a subsequent increase in brake pipe pressure for releasing fluid under pressure from said brake cylinder and also permitting flow through said charging communication, a timing reservoir and an auxiliary reservoir charging delay valve interposed in said charging communication and subject to pressure of fluid in said timing reservoir opposing a spring bias for permitting flow through or closing said charging communication selectively according to whether timing reservoir pressure is less than or exceeds a selected value, said brake controlling valve means being operative when in brake release position to establish a restricted communication for releasing fluid under pressure from said timing reservoir at a controlled rate, and said brake controlling valve means being operative when in a position other than said brake release position to charge said timing reservoir to a pressure above said selected value.

7. In a fluid pressure brake equipment, the combination of a normally charged brake pipe, an auxiliary reservoir, a brake cylinder, a brake controlling valve device operative upon a reduction in brake pipe pressure below normal charge value to a brake applying position for supplying fluid under pressure from said auxiliary reservoir to said brake cylinder and operative upon a subsequent increase in pressure in said brake pipe to a brake release position for releasing fluid under pressure from the brake cylinder and permitting flow of fluid under pressure from said brake pipe to said auxiliary reservoir, a timing reservoir, an auxiliary reservoir charging delay valve controlling a charging communication normally connecting said brake pipe to said brake controlling valve device for permitting charging of said auxiliary reservoir and operative in response to fluid at the pressure of fluid in said timing reservoir in excess of a selected value to close said charging communication, and a restricted release communication controlled by said brake controlling valve device and opened by the latter when in its brake release position for venting said timing reservoir to atmosphere at a controlled rate, said brake controlling valve device being operative to charge said timing reservoir with fluid under pressure when it is in another position, intermediate said brake release position and brake applying position, and also operative to bottle up fluid under pressure in said timing reservoir when in its said brake applying position.

8. In a fluid pressure brake equipment, the combination of a brake pipe, an auxiliary reservoir, a brake cylinder, an emergency reservoir from which fluid under pressure is supplied to the brake cylinder only upon an emergency rate of reduction in brake pipe pressure, a brake controlling valve device operative upon a service or emergency rate of reduction in brake pipe pressure to a brake applying position to supply fluid under pressure from said auxiliary reservoir to said brake cylinder and upon a subsequent increase in pressure in said brake pipe to a brake release position for releasing fluid under pressure from the brake cylinder and permitting flow of fluid under pressure from said brake pipe to said auxiliary reservoir, a timing reservoir and by way of said auxiliary reservoir to said emergency reservoir, a charging delay valve controlling a charging communication normally connecting said brake pipe to said brake controlling valve device for permitting charging of said auxiliary reservoir and operative in response to pressure of fluid in said timing reservoir in excess of a selected value to closed said charging communication, and a restricted comunication controlled by said brake controlling valve device and opened by the latter when in its brake release position for venting said timing reservoir to atmosphere, said brake controlling valve device being operative when in its brake applying position to charge said timing reservoir with fluid under pressure from said emergency.

References Cited in the file of this patent
UNITED STATES PATENTS

| | | |
|---|---|---|
| 1,720,249 | Guillemin-Tarayre | July 9, 1929 |
| 1,832,893 | Chevillot | Nov. 24, 1931 |
| 1,936,966 | Kasantzeff | Nov. 28, 1933 |